US012691933B2

(12) United States Patent
Sørensen

(10) Patent No.: US 12,691,933 B2
(45) Date of Patent: Jul. 28, 2026

(54) STEERING SYSTEM

(71) Applicant: Danfoss Power Solutions ApS,
Nordborg (DK)

(72) Inventor: Ole Falck Sørensen, Sønderborg (DK)

(73) Assignee: **DANFOSS POWER SOLUTIONS
APS**, Nordborg (DK)

( * ) Notice: Subject to any disclaimer, the term of this
patent is extended or adjusted under 35
U.S.C. 154(b) by 388 days.

(21) Appl. No.: 18/356,370

(22) Filed: Jul. 21, 2023

(65) Prior Publication Data

US 2024/0034397 A1 Feb. 1, 2024

(30) Foreign Application Priority Data

Jul. 27, 2022 (EP) ..................................... 22187131

(51) Int. Cl.
B62D 5/30 (2006.01)
B62D 5/065 (2006.01)

(52) U.S. Cl.
CPC .............. B62D 5/30 (2013.01); B62D 5/065
(2013.01)

(58) Field of Classification Search
CPC .......... B62D 5/30; B62D 5/065; B62D 5/093;
B62D 5/32; B62D 5/091; B62D 1/22;
B62D 5/005; B62D 5/06; B62D 1/04;
B62D 5/063; B62D 5/08
See application file for complete search history.

(56) References Cited

U.S. PATENT DOCUMENTS

| | | | |
|---|---|---|---|
| 4,955,445 A | 9/1990 | Kauss | |
| 5,234,070 A | 8/1993 | Noah et al. | |
| 6,438,950 B1 | 8/2002 | Peistrup et al. | |
| 6,560,961 B2 * | 5/2003 | Draper ................... | B62D 5/097 |
| | | | 60/387 |
| 7,931,112 B2 * | 4/2011 | Gehlhoff ................. | B62D 5/30 |
| | | | 180/417 |
| 8,157,033 B2 * | 4/2012 | Gilbert ................. | B62D 11/183 |
| | | | 180/6.48 |
| 8,397,858 B2 * | 3/2013 | Krahn ...................... | B62D 5/30 |
| | | | 180/405 |
| 9,200,645 B2 * | 12/2015 | Krahn ...................... | B62D 1/22 |

(Continued)

FOREIGN PATENT DOCUMENTS

| | | |
|---|---|---|
| BR | 102016029282 A2 | 10/2017 |
| CA | 2184218 C | 12/1997 |

(Continued)

*Primary Examiner* — Drew J Brown
(74) *Attorney, Agent, or Firm* — McCormick, Paulding &
Huber PLLC

(57) ABSTRACT

A steering system (1) is described including a supply port
arrangement having a supply port (P) and a return port (T),
a steering command arrangement having a steering sensor
(5), a controller (9) connected to the steering sensor (5), an
electro-hydraulic steering valve (8) con-trolled by the con-
troller (9), and a working port arrangement having two
working ports (L, R), wherein the working port arrangement
is connected to the supply port arrangement by means of the
steering valve (8). Such a steering system should have a
good comfort. To this end the steering command arrange-
ment includes a steering wheel (4) connected to a hydraulic
pumping unit (7), wherein the pumping unit (7) is part of a
hydraulic circuit (11) having means for creating a flow
resistance.

19 Claims, 1 Drawing Sheet

(56)  References Cited

U.S. PATENT DOCUMENTS

| | | | | |
|---|---|---|---|---|
| 9,421,999 | B2 * | 8/2016 | Rotole .................. | B62D 11/24 |
| 9,439,341 | B2 * | 9/2016 | Bebernes ............. | G05D 1/0278 |
| 11,014,604 | B2 | 5/2021 | Pedersen et al. | |
| 11,273,861 | B2 | 3/2022 | Emmert et al. | |
| 2008/0087014 | A1 * | 4/2008 | Schick .................. | B62D 5/001 |
| | | | | 60/403 |
| 2009/0114469 | A1 | 5/2009 | Thomsen et al. | |
| 2017/0072998 | A1 * | 3/2017 | Krahn ..................... | B62D 5/09 |
| 2018/0297632 | A1 | 10/2018 | Emmert et al. | |

FOREIGN PATENT DOCUMENTS

| | | | | | |
|---|---|---|---|---|---|
| CN | 102923188 | A | | 2/2013 | |
| CN | 110949502 | A * | 4/2020 | .............. | B62D 5/06 |
| CN | 113911208 | A * | 1/2022 | .............. | B62D 5/30 |
| CN | 117465548 | A * | 1/2024 | ............ | B62D 5/091 |
| CN | 119021925 | A * | 11/2024 | .............. | B62D 5/30 |
| CN | 119611500 | A * | 3/2025 | .............. | B62D 5/08 |
| DE | 3837395 | A1 | | 5/1989 | |
| DE | 10 2007 053 024 | B4 | | 3/2010 | |
| DE | 102019109144 | A1 * | 10/2020 | ............ | B62D 5/065 |
| EP | 2 576 322 | B1 | | 1/2016 | |
| WO | 2015/175882 | A1 | | 11/2015 | |

* cited by examiner

STEERING SYSTEM

CROSS-REFERENCE TO RELATED APPLICATION

This application claims foreign priority benefits under 35 U.S.C. § 119 from European Patent Application No. 22187131.2, filed Jul. 27, 2022, the content of which is hereby incorporated by reference in its entirety.

TECHNICAL FIELD

The present invention relates to a steering system comprising a supply port arrangement having a supply port and a return port, a steering command arrangement having a steering sensor, a controller connected to the steering sensor, an electro-hydraulic steering valve controlled by the controller, and a working port arrangement having two working ports, wherein the working port arrangement is connected to the supply port arrangement by means of the steering valve.

BACKGROUND

Such a steering system is known, for example, from DE 10 2007 053 024 B4. A vehicle equipped with such a steering system can be steered under the control of the electro-hydraulic steering valve on the one hand or under the control of a conventional steering unit on the other hand.

SUMMARY

The object underlying the invention is to provide a steering system that has a good comfort.

This object is solved with a steering system as described at the outset in that the steering command arrangement comprises a steering wheel connected to a hydraulic pumping unit, wherein the pumping unit is part of a hydraulic circuit having means for creating a flow resistance, wherein the hydraulic circuit is connected to the steering valve by means of a safety valve establishing or interrupting a hydraulic flow path between the hydraulic circuit and the steering valve.

In such a system the electro-hydraulic steering valve is the principle means for controlling the flow to and from the working port arrangement, i.e. the means for determining the amount of hydraulic fluid which is delivered to a steering motor connected to the working ports of the working port arrangement. The hydraulic circuit is used for two purposes: in an undisturbed condition it creates a sort of "steering feel" since the pumping means which are driven by the steering wheel pump hydraulic fluid through the circuit and the circuit shows a certain flow resistance for the pumped fluid. Thus, rotating the steering wheel has to overcome a certain torque and the driver experiences a feeling which is comparable to the feeling which is produced when the vehicle is steered by a mechanical steering unit. Under normal circumstances the fluid from the pumping unit is not used for steering purposes and this fluid is only "pumped around".

In embodiment of the invention the safety valve establishes a hydraulic connection between the hydraulic circuit and the working port arrangement in case of a lack of pressure at the supply port. Thus, the safety valve is operated automatically, so that steering of the vehicle equipped with the steering system is always possible.

In an embodiment of the invention the safety valve is connected to the working port arrangement via the steering valve. Thus, no additional connections to the working port arrangement are necessary.

In an embodiment of the invention the means for creating the flow resistance have a variable orifice. The variable orifice is the main element for creating the flow resistance. When the orifice is variable, the flow resistance can also be varied. Thus, the steering feeling can be adapted to different driving situations. It is, for example, possible to have a low flow resistance when the speed of the vehicle is low and that the flow resistance is high when the speed of the vehicle is high.

In an embodiment of the invention the means for creating the flow resistance are at least partly arranged in the safety valve. Thus, no additional means are necessary.

In an embodiment of the invention a flow resistance of the means for creating the flow resistance depends on a valve position of the safety valve. The safety valve can have, for example, a spool which is moveable in a housing or within a sleeve. The spool defines with a corresponding counterpart at least one orifice and the size of the orifice is then defined by the position of the spool.

In an embodiment of the invention the hydraulic circuit comprises a steering feeling valve connected to the supply port arrangement. The steering feeling valve is able to supply additional hydraulic flow into the hydraulic circuit. Thus, such a flow can either support the rotation of the steering wheel or can produce a larger counter torque. Furthermore, the steering feeling valve can be used for self-centering of the vehicle, i.e. can be used to bring the angular position of the steering wheel and the angular position of the steered wheels into line.

In an embodiment of the invention the hydraulic circuit comprises a relief valve arrangement in a line connecting two ports of the pumping unit. The pumping unit drives hydraulic fluid from one port to the other port, wherein the direction of the flow depends on the direction in which the steering wheel is rotated. The relief valve arrangement can be used to define a maximum torque of the steering wheel. Furthermore, it can simulate an end-stop steering wheel position in which the steering wheel cannot be rotated further.

In an embodiment of the invention the relief valve arrangement comprises two relief valves, wherein each relief valve is controlled by a pressure difference over the relief valve and is bridged by a check valve opening in a direction away from the other relief valve. Thus, the two relief valves can be arranged in a common line. The pressure on the upstream side of each relief valve corresponds to the pressure produced by the output side of the pumping unit and the pressure on the opposite side of the relief valve corresponds basically onto the pressure at the input side of the pumping unit. A pressure drop at the check valve is in this case neglectable.

In an embodiment of the invention the steering command arrangement comprises in addition to the steering wheel a steering command device, wherein the steering wheel is connected to the pumping unit by means of a releasable coupling. The steering command device can be, for example, a joystick or the like. When the vehicle is steered by means of the joystick, it is not necessary that the steering wheel rotates upon steering the vehicle. Such a rotation can be prevented by the use of the releasable coupling.

In an embodiment of the invention the steering valve comprises safety valve ports connected to the safety valve, wherein the steering valve comprises a main fluid path arranged for each direction of steering and a check valve arrangement, the check valve arrangement allowing a flow of hydraulic fluid from the safety valve to one of the working ports and away from the other working port to the safety valve depending on the valve position of the steering valve. Thus, if needed, the flow of hydraulic fluid produced by the rotation of the steering wheel can be used to increase the flow delivered to the working port arrangement and to increase the steering speed.

In an embodiment of the invention in a neutral position of the steering valve the check valve arrangement closes a connection between the safety valve ports and the return port. This is an additional safety measure. There is no possibility that hydraulic fluid escapes to the return port. All hydraulic fluid flow produced in an emergency case by the rotation of the steering wheel and the pumping unit is supplied to the working port arrangement.

In an embodiment of the invention the safety valve comprises actuating means allowing a remote actuation of the safety valve. The safety valve can be, for example, electrically operated by means of a solenoid arrangement or hydraulically by means of corresponding pressures.

In an embodiment of the invention the pumping unit is a measuring motor. In this case the steering system can be equipped with a conventional mechanical steering unit.

In an alternative embodiment the pumping unit is a hydraulic pump, in particular in form of an orbitrol. Thus, only a part of the conventional steering unit is used in such a steering unit.

BRIEF DESCRIPTION OF THE DRAWINGS

Embodiments of the invention will now be described in more detail with reference to the drawing, in which.

DETAILED DESCRIPTION

Figure 1:
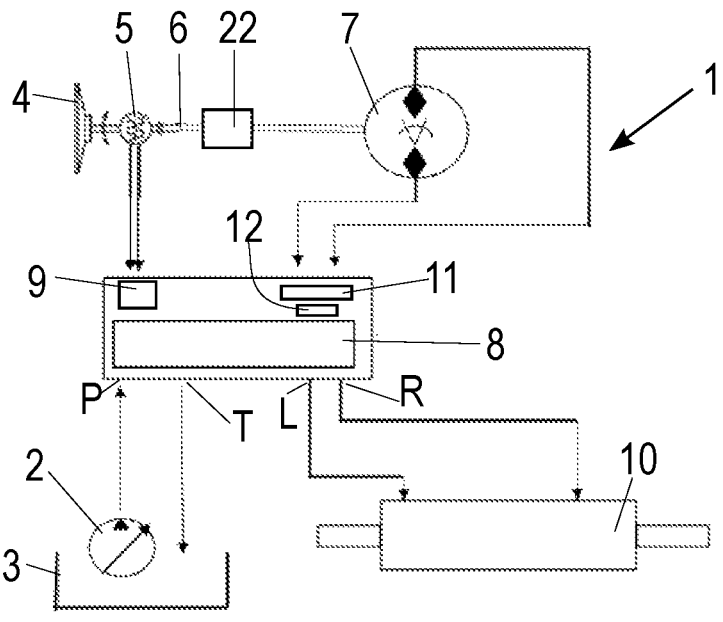
FIG. 1 shows schematically a steering system.

FIG. 1 shows schematically a steering system 1 comprising a supply port arrangement having a supply port P and a return port T. The supply port P is connected to a pump 2 which can be operated, for example, by the combustion engine of the vehicle to be steered by the steering system. The return port T is connected to a tank 3.

The steering system 1 comprises a steering wheel 4 which forms at least part of a steering command arrangement. The steering wheel 4 is connected to a steering sensor 5 and to a column 6 by means of which it is connected to a pumping unit 7. The pumping unit 7 can be in form of a measuring motor of a conventional hydraulic steering unit or it can be simply a hydraulic pump, for example in form of an orbitrol.

The steering system furthermore comprises an electro-hydraulic steering valve 8 controlled by a controller 9, wherein the controller 9 receives sensor signals of the steering sensor 5. The steering valve 8 comprises a working port arrangement having two working ports L, R which are connected to a steering motor 10.

The steering valve 8 is used to establish a connection between the supply port P and one of the working ports L, R and at the same time to establish a connection between the other of the working ports R, L and the return port T. The direction of the flow of fluid from the pump 2 to the steering motor 10 depends on the direction of rotation of the steering wheel 4 which is detected by the steering sensor 5. The steering sensor 5 cannot only detect the angle by which the steering wheel 4 is rotated, but also the speed of rotation.

Figure 2:
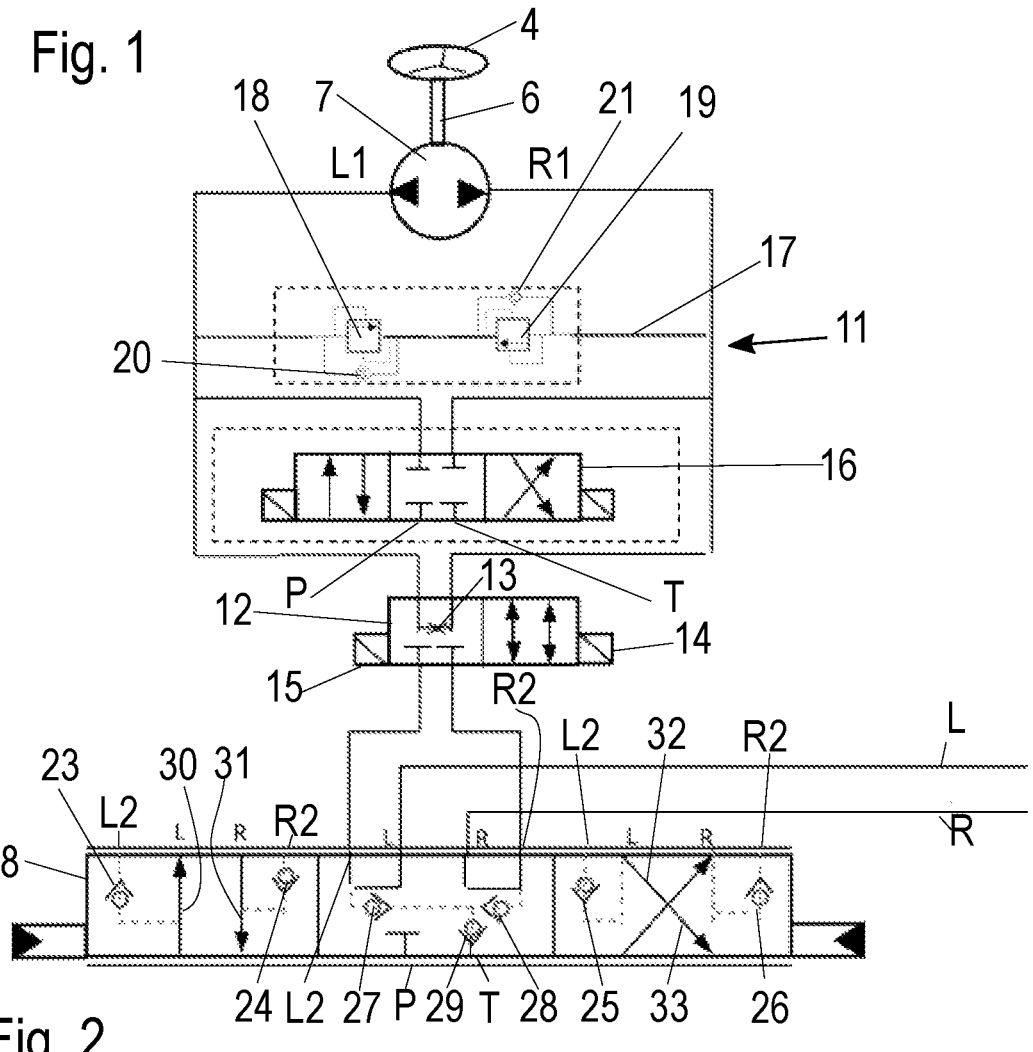
FIG. 2 shows schematically parts of the steering system.

The pumping unit 7 is connected to a hydraulic circuit 11 having means for creating a flow resistance, in particular an orifice, as shown in FIG. 2. Furthermore, the hydraulic circuit 11 is connected to the steering valve 8 by means of a safety valve 12. The safety valve 12 establishes or interrupts a hydraulic flow path between the hydraulic circuit 11 and the steering valve 8.

Thus, in "normal" condition, the vehicle equipped with the steering system according to FIG. 1 is steered exclusively under the control of the steering valve 8 which in turn is actuated depending on the rotation of the steering wheel 4. Only in an emergency case, for example, when the pressure of the pump 2 is not sufficient to actuate the steering motor 10, a connection between the pumping means 7 and the steering motor 10 is established via the safety valve 12 and the hydraulic circuit 11, so that the rotation of the steering wheel 4 drives hydraulic fluid in a controlled way to the steering motor 10.

Further details of the steering system 1 are shown in FIG. 2. The same elements are denoted with the same reference numerals. FIG. 2 does not show the steering sensor 5.

The pumping unit 7 comprises two ports L1, R1 which are used as input port and output port for the pumping unit 7 depending on the direction of rotation of the steering wheel 4. The two ports L1, R1 are connected to the hydraulic circuit 11. The hydraulic circuit 11 comprises a variable orifice 13 which is arranged in the safety valve 12. FIG. 2 shows the position of the safety valve 12, in which a hydraulic connection between the hydraulic circuit 11 and the steering valve 8 is interrupted. In this case, there is a loop formed between the two ports L1, R1 of the pumping unit 7 and this loop comprises the flow resistance produced by the orifice 13, so that hydraulic fluid is only "pumped around" and produces a counter torque with respect to the torque which is used to rotate the steering wheel 4.

It should be noted that the orifice 13 can be a variable orifice. The flow resistance of the orifice 13 can be varied by changing the position of the safety valve 12. To this end the safety valve 12 can be equipped, for example, with a spool which is displaceable in a housing. The orifice 13 can be formed by respective openings in the spool and in the housing, so that the displacement of this spool in the housing changes the flow resistance of the orifice 13.

The safety valve 12 can be actuated electrically. To this end it comprises one or more solenoids 14, 15 which can be used to displace, for example, the spool in the housing. In an alternative embodiment the safety valve 12 can be actuated hydraulically.

The actuation of the safety valve 12 can be made automatically, for example, when the pressure of the pump 2 decreases under a pre-defined level.

The hydraulic circuit 11 comprises furthermore a steering feeling valve 16 which is connected to the supply port P and to the return port T. The steering feeling valve 16 can be used, for example, for self-centering of the vehicle, i.e. for the electrically follow-up of the steering wheel position. Furthermore, it can be used to change the pressure conditions in the hydraulic circuit 11. When, for example, the supply port P is connected to the left-hand port L1 of the pumping means 7 and the steering wheel 4 is rotated into the left-hand direction, the driver has to produce a larger torque to rotate the steering wheel 4. On the other hand, when the driver rotates the steering ring wheel 4 under the same conditions to the right-hand side, he needs less torque than previously. Thus, the steering feeling valve 16 can change the feed-back of the vehicle which experiences the driver at the steering wheel 4.

Furthermore, the hydraulic circuit 11 comprises a relief valve arrangement in a line 17 connecting the two ports L1, R1 of the pumping unit 7. The relief valve arrangement comprises two relief valves 18, 19. Each relief valve 18, 19 is loaded in an opening direction by a pressure at the port L1, R1, respectively of the pumping unit 7 to which the respective relief valve is connected. The relief valves 18, 19 are loaded in a closing direction by the pressure at the respective outlets of the relief valves 18, 19. Furthermore, each relief valve 18, 19 is bridged by a check valve 20, 21 opening in a direction away from the other relief valve 19,18.

Thus, the relief valve arrangement having the two relief valves 18, 19 can be used to define a maximum torque which has to be overcome by the steering wheel 5. When this torque is exceeded, for example, when the pressure at the left port L1 of the pumping means 7 is too high, the relief valve 18 opens and allows fluid to escape via the check valve 21 of the other relief valve 19 to the right port R1 of the pumping unit 7.

Furthermore, it can be used to limit pressure that can simulate an end stop steering wheel position.

In FIG. 1 a coupling 22 is shown which is releasable and connects the column 6 of the steering wheel 4 to the pumping unit 7. Thus, the pumping unit 7 can be actuated, for example, by a flow flowing through the hydraulic circuit 11, without rotating the steering wheel 4.

The hydraulic circuit 11 can also be used to supply additional hydraulic flow to the working ports L, R of the working port arrangement, for example, to increase the steering speed. To this end, the safety valve 12 is moved from the closed position shown in FIG. 2 to an open position in which a connection between the hydraulic circuit 11 and the steering valve 8 is established.

The steering valve 8 comprises safety valve ports L2, R2 to which the safety valve 12 is connected.

The steering valve 8 comprises a check valve arrangement having check valves 23-29. The steering valve 8 comprises a main fluid path arrangement which is symbolized by two flow paths 32, 33 for each direction of steering (one flow path to the left working port L and back from the right working port R and the other flow path to the working port and back from the left working port). The check valves 23-29 of the check valve arrangement allow a flow of hydraulic fluid from the safety valve 12 to one of the working ports and back from the other working ports to the safety valve 2 depending on the valve position of the steering valve 8.

Which check valves are active depend on the position of the steering valve 8. The safety valve port L2 is connected to a check valve 23 opening away from the safety port L2 or to a check valve 25 opening in a direction towards the safety valve port L2. The same is true for the other safety valve port R2 which is connected to check valves 24, 26 depending on the position of the steering valve 8. In the neutral position of the steering valve 8, the left safety valve port L2 is connected to a check valve 27 and the right safety valve port R2 is connected to a check valve 28. Both check valves 27, 28 are closed by a pressure at the respective safety valve port L2, R2. Furthermore, a connection between the two check valves 27, 28 is connected to a further check valve 29 which closes in a direction to the return port T.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A steering system comprising a supply port arrangement having a supply port and a return port, a steering command arrangement having a steering sensor, a controller connected to the steering sensor, an electro-hydraulic steering valve controlled by the controller, and a working port arrangement having two working ports, wherein the working port arrangement is connected to the supply port arrangement by means of the steering valve, wherein the steering command arrangement comprises a steering wheel connected to a hydraulic pumping unit, wherein the pumping unit is part of a hydraulic circuit having means for creating a flow resistance, and wherein the means for creating the flow resistance have a variable orifice.

2. The steering system according to claim 1, wherein the hydraulic circuit is connected to the steering valve by means of a safety valve establishing or interrupting a hydraulic flow path between the hydraulic circuit and the steering valve.

3. The steering system according to claim 2, wherein the safety valve establishes a hydraulic connection between the hydraulic circuit and the working port arrangement in case of a lack of pressure at the supply port.

4. The steering system according to claim 3, wherein the safety valve is connected to the working port arrangement via the steering valve.

5. The steering system according to claim 3, wherein the means for creating the flow resistance are at least partly arranged in the safety valve.

6. The steering system according to claim 2, wherein the means for creating the flow resistance are at least partly arranged in the safety valve.

7. The steering system according to claim 6, wherein a flow resistance of the means for creating the flow resistance depends on a valve position of the safety valve.

8. The steering system according to claim 1, wherein the hydraulic circuit comprises a steering feeling valve connected to the supply port arrangement.

9. The steering system according to claim 1, wherein the hydraulic circuit comprises a relief valve arrangement in a line connecting two ports of the pumping unit, the relief valve arrangement comprising two relief valves, wherein each relief valve is controlled by a pressure difference over the relief valve and is bridged by a check valve opening in a direction away from the other relief valve.

10. The steering system according to claim 1, wherein the steering command arrangement comprises in addition to the steering wheel a steering command device, wherein the steering wheel is connected to the pumping unit by means of a releasable coupling.

11. The steering system according to claim 1, wherein the safety valve comprises actuating means allowing a remote actuation of the safety valve.

12. The steering system according to claim 1, wherein pumping unit is a measuring motor.

13. The steering system according to claim 1, wherein the pumping unit is a hydraulic pump.

14. The steering system according to claim 13, wherein the pumping unit is an orbitrol.

15. The steering system according to claim 1, wherein means are adapted to adjust the adjustable orifice to generate a low flow resistance when the speed of the vehicle is a first speed, and to adjust the adjustable orifice to generate a high flow resistance when the speed of the vehicle is a second speed, wherein the second speed is greater than the first speed and the high flow resistance is greater than the low flow resistance.

16. A steering system comprising a supply port arrangement having a supply port and a return port, a steering command arrangement having a steering sensor, a controller connected to the steering sensor, an electro-hydraulic steering valve controlled by the controller, and a working port arrangement having two working ports, wherein the working port arrangement is connected to the supply port arrangement by means of the steering valve, wherein the steering command arrangement comprises a steering wheel connected to a hydraulic pumping unit, wherein the pumping unit is part of a hydraulic circuit having means for creating a flow resistance, wherein the hydraulic circuit is connected to the steering valve by means of a safety valve establishing or interrupting a hydraulic flow path between the hydraulic circuit and the steering valve, and wherein the safety valve is connected to the working port arrangement via the steering valve.

17. The steering system according to claim 16, wherein the means for creating the flow resistance are at least partly arranged in the safety valve.

18. A steering system comprising a supply port arrangement having a supply port and a return port, a steering command arrangement having a steering sensor, a controller connected to the steering sensor, an electro-hydraulic steering valve controlled by the controller, and a working port arrangement having two working ports, wherein the working port arrangement is connected to the supply port arrangement by means of the steering valve, wherein the steering command arrangement comprises a steering wheel connected to a hydraulic pumping unit, wherein the pumping unit is part of a hydraulic circuit having means for creating a flow resistance, and wherein steering valve comprises safety valve ports connected to the safety valve, wherein the steering valve comprises a main fluid path arrangement for each direction of steering and a check valve arrangement, the check valve arrangement allowing a flow of hydraulic fluid from the safety valve to one of the working ports and back from the other working port to the safety valve depending on the valve position of the steering valve.

19. The steering system according to claim 18, wherein in a neutral position of the steering valve the check valve arrangement closes a connection between the safety valve ports and the return port.

* * * * *